United States Patent [19]

Wolff

[11] Patent Number: 5,181,768
[45] Date of Patent: Jan. 26, 1993

[54] PRESSURE SWITCH VALVE, FOR HYDRAULIC VEHICLE BRAKE SYSTEMS WITH TRACTION CONTROL (ASR)

[75] Inventor: Guenter Wolff, Schwieberdingen, Fed. Rep. of Germany

[73] Assignee: Robert Bosch GmbH, Stuttgart, Fed. Rep. of Germany

[21] Appl. No.: 699,030

[22] Filed: May 13, 1991

[30] Foreign Application Priority Data

Jun. 15, 1990 [DE] Fed. Rep. of Germany ....... 4019068

[51] Int. Cl.⁵ .......................... A60T 8/32; B60K 28/16
[52] U.S. Cl. ................................ 303/84.2; 137/539.5; 303/113.2
[58] Field of Search ........ 303/113 TR, 113 R, 116 R, 303/116 SP, D1-D6, 84.1, 84.2; 137/115, 539, 539.5

[56] References Cited

U.S. PATENT DOCUMENTS 4,861,118 8/1989 Burckhardt et al. ......... 303/113 TR

FOREIGN PATENT DOCUMENTS 1049184 7/1959 Fed. Rep. of Germany .
2520889 12/1975 Fed. Rep. of Germany ..... 303/84.2
8703511 3/1987 Fed. Rep. of Germany .

Primary Examiner—Matthew C. Graham
Attorney, Agent, or Firm—Edwin E. Greigg; Ronald E. Greigg

[57] ABSTRACT

A pressure switch valve which briefly raises a pressure during switching of the valve. The pressure switch valve has a cylindrical chamber with a first ball that engages a valve seat of an inflow conduit. A second, spring-loaded ball is supported on the first. Both balls are longitudinally movable with slight radial play in the cylindrical chamber. An outflow conduit branches off from the cylindrical chamber at one point in such a way that upon switching of the valve, a normal plane containing the spherical center of the first ball toward the valve seat and extending at right angles to the longitudinal axis of the chamber does not reach the mouth cross section of the outflow conduit until a corresponding normal plane of the second ball toward the spring has already exited from the mouth cross section.

7 Claims, 1 Drawing Sheet

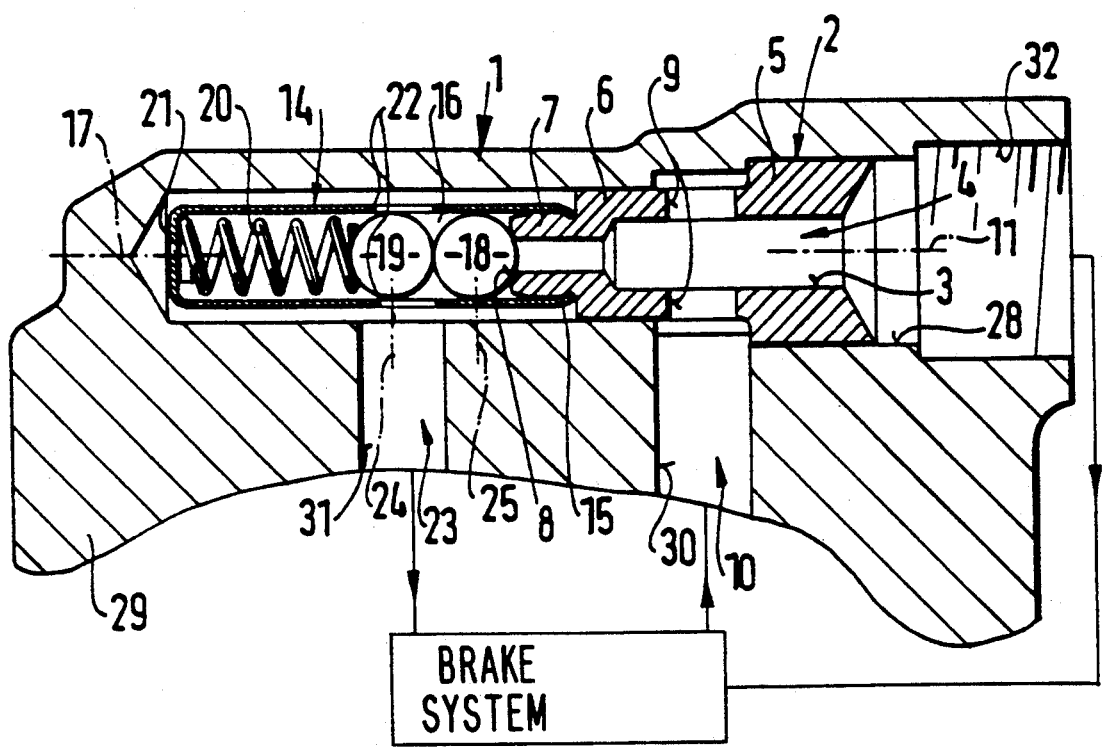

PRESSURE SWITCH VALVE, FOR HYDRAULIC VEHICLE BRAKE SYSTEMS WITH TRACTION CONTROL (ASR)

BACKGROUND OF THE INVENTION

The invention is based on a pressure switch valve as generically defined hereinafter.

In brake systems with an apparatus for limiting drive slip or wheel spin, also known as traction control, it is desirable when the traction control comes into play to have the brake linings of the wheel brakes engage the brake disk or drum as fast as possible. Contrarily, when brake pressure is next fed to the wheel brake or brakes of the spinning driven vehicle wheel or wheels, the brake pressure should rise at a defined speed. Better control of brake pressure metering can be attained in this way.

For the above reason, a hydraulic brake system for vehicles with an apparatus for limiting drive slip at the drivable vehicle wheels, has been proposed which has a pressure generator that can be acted upon hydraulically and operates by the plunger principle, to generate brake pressure (German Patent Application P 39 36 578.6). The pressure generator, connected to a pressure source, is preceded by a pressure switch valve with a throttle that is inoperative until the brake linings contact the drum or disk. The pressure rising in the activated part of the brake system upon brake lining application switches the valve, making the throttle operative and supplying the pressure generator with a reduced quantity of pressure fluid. The next time the brake pressure is increased, the result is a reduced speed of the pressure rise.

A hydraulic brake system with an apparatus for limiting drive slip has also been proposed that has a high-pressure pump to generate brake pressure in the wheel brake of a spinning vehicle wheel and a low-pressure pump, called a precharging pump, for supplying the high-pressure pump with pressure fluid (German Patent Application P 40 17 872.2). The low-pressure pump is connected in the brake system in such a way that as the traction control begins to become operative it first feeds directly into the wheel brake, causing the brake lining to contact the drum or disk, before pumping by the high-pressure pump begins. However, under extreme conditions, the pressure generated by the low-pressure pump is not always adequate for application of the brake lining. A pressure switch valve that is intended to limit the pressure generated by the pump is disposed parallel to the low-pressure pump.

OBJECT AND SUMMARY OF THE INVENTION

The pressure switch valve, according to the invention, has an advantage over the prior art by which a pressure increase in the inflow conduit is attained for a limited period of time during which the valve switches over, or in other words the ball toward the valve seat uncovers the opening of the outflow conduit. The pressure increase and its duration can be determined in particular by the dimensioning of the radial play of the balls in the chamber and by the depth to which a second ball must penetrate into the chamber section adjoining the opening, on the side toward the spring, in order to open the outflow conduit cross section.

The pressure generated by the low-pressure pump of the aforementioned hydraulic brake system can therefore be briefly increased upon supply onset, if the pressure switch valve according to the invention is connected by its inflow conduit to the low-pressure pump pressure line and by its outflow conduit to the low-pressure pump intake line, and if a line is drawn directly to the wheel brake from the inflow side of the pressure switch valve, through which line the increased pressure can become operative until the switchover. The low pressure pump may be subjected to a greater load, but since this lasts only briefly, an overload is avoided.

The embodiment of the pressure switch valve defined herein is especially advantageous, because this creates a easily testable structural unit that can be made economically from component parts that are simple to assemble.

The provision recited herein discloses variants for an economical production of the outflow conduits, and weakening of a hollow part can be avoided by the selection of the number, shape and location of the openings in it.

With the further features disclosed herein, an assembly of the pressure switch valve and simplifications in terms of attachment techniques are disclosed.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment in simplified form, in terms of a longitudinal section through a pressure switch valve.

DESCRIPTION OF THE PREFERRED EMBODIMENT

The pressure switch valve 1 shown in the drawing has a wedged part 2 with a longitudinal, stepped through bore 3 which be formed by turning on a lathe. This bore serves as a distributor conduit 4 for a hydraulic pressure fluid. The wedged part 2 has a first cylindrical portion 5, adjoined by a second cylindrical portion 6 of smaller diameter and in turn by a cylindrical attachment 7. At the attachment 7, the bore 3 changes into a valve seat 8. In the region of the second cylindrical portion 6, the bore 3 of the wedged part 2 is crossed by a transverse bore 9, which serves as an inflow conduit 10 for pressure fluid.

Adjoining the wedged part 2 is a bushing-like hollow part 14, the open end portion 15 of which is mounted sealingly on the cylindrical portion 7 of the cylindrical portion 6 of the wedged part and joined to it form-fittingly. The hollow part 14 has a cylindrical chamber 16 with a longitudinal axis 17 extending coaxially with the longitudinal axis 11 of the wedged part 2. On the side toward the valve seat, the chamber 16 receives a first ball 18. The ball serves as a closing body cooperating with the valve seat 8 of the wedged part 2. The first ball 18 is engaged by a second ball 19, received in the chamber 16 of the hollow part 17, and this ball is under the influence of a cylindrical helical compression spring 20 also located in the chamber 16. This spring is supported on the bottom 21 of the hollow part 14 remote from the valve seat 8 of the wedged part 2.

The two balls 18 and 19 have the same diameter and are longitudinally guided, with slight radial play, in the cylindrical chamber 16 of the hollow part 14. The hollow part 14 also has two openings 22 opposite one another, which are part of an outflow conduit 23 for pressure fluid. The openings 22 have a circular cross section, but they may also be embodied as oblong slots. They may also be more or less than two in number. In the position of repose of the two balls 18 and 19, and viewed from the valve seat 8, the cross section of the mouth of the outflow conduit 23 formed by the openings 22 begins between the two balls and ends downstream of the normal plane 24 of the second ball 19 that extends at right angles to the longitudinal axis 17 of the chamber and contains the spherical center of the second ball 19. The corresponding normal plane 25 of the first ball, again viewed from the direction of the valve seat 8, is spaced apart by a greater distance from the beginning of the mouth cross section of the outflow conduit 23 than that by which the normal plane 24 is spaced apart from the end of the mouth cross section.

The pressure switch valve 1 in the form of a structural unit, comprising the wedged part 2, hollow part 14 with the balls 18 and 19 introduced into it, and the spring 20, is received in a stepped blind bore 28 of a pump housing 29. The first cylinder portion 5 and the second cylinder portion 6 of the wedged part are seated tightly with a press fit in the bore 28 of the housing 29. The transverse bore 9 of the wedged part 2 is continued by a bore 30 of the housing 29 by which the inflow conduit 10 communicates with the pressure side of a low-pressure pump, or precharging pump, of a vehicle brake system (not shown). The hollow part 14 of the pressure switch valve 1 is received with a circumferential gap in the bore 28 of the housing 29. In the region of the openings 22 of the hollow part 14, the housing 29 has a bore 31 that continues the outflow conduit 23. The outflow conduit 23 leads to the intake side of the low pressure pump (not shown). The housing 29 also has a connection neck 32, extending coaxially with the bore 28 and through which the pressure switch valve 1 is introduced into the housing 29. The connection neck 32, which is a continuation of the distributor conduit 4 of the pressure switch valve 1, serves the purpose of connection to wheel brake cylinders (not shown) or to the intake side of a high-pressure pump (also not shown) of the vehicle brake system.

The function of the pressure switch valve 1 is as follows:

Pressure fluid aspirated by the low-pressure pump from a supply tank of a hydraulic vehicle brake system is pumped into the inflow conduit 10 and flows through the distributor conduit 4 and connection neck 32 to the wheel brake cylinder of the vehicle wheel undergoing a loss of traction. The wheel brake cylinder presents resistance to the pressure fluid, so that the pressure in the wheel brake cylinder, distributor conduit 4 and inflow conduit 10 rises and causes the first ball 18 to lift from the valve seat 8, counter to the force of the compression spring 20. Upon further increased pressure in the distributor conduit 4, both balls 18 and 19 migrate toward the bottom 21 of the hollow part 14, counter to the resistance of the compression spring 20. In this process the normal plane 24 of the second ball 19, the one toward the spring, reaches the end of the mouth cross section of the outflow conduit 23 before the normal plane 25 of the first ball 18, that is, the one toward the valve seat, has reached the beginning of the mouth cross section. The first ball 18, which continues to be loaded by the high pressure in the distributor conduit 4, now moves the second ball 19 deeper into the part of the chamber toward the spring, positively displacing pressure fluid located in the chamber 16. Damping of the opening motion of the first ball 18 ensues, while the increased pressure continues to be maintained in the inflow conduit 10, distributor conduit 4 and wheel brake cylinder. However, once the normal plane 25 of the first ball 18, toward the valve seat, has reached the mouth cross section toward the cylindrical chamber 16 of the second outflow conduit 23, the openings 22 of the hollow part 14 are uncovered in the further course of the motion of the first ball 18, that is, the ball toward the valve seat. While pressure fluid was able to overcome the very narrow gap between the ball 18 and the inside circumference of the chamber only with a small volumetric flow after the lifting of the first ball 18, toward the valve seat, from the valve seat 8, a relatively large volumetric flow now flows through the second outflow conduit 23 to the intake side of the low pressure pump of the vehicle brake system. Once the openings 22 are uncovered by the first ball 18, toward the valve seat, the higher pressure generated by the low pressure pump collapses in the inflow conduit 10, distributor conduit 4 and wheel brake cylinder. As a result, the low-pressure pump is now exposed to its lower design pressure, which is adequate to supply the high-pressure pump with pressure fluid. The high pressure-pump now takes on the task of increasing the brake pressure in he wheel brake cylinder. The higher pressure generated by the low-pressure pump during the above-described switching of the pressure switch valve 1 was adequate, however, for making the brake linings come into contact with the brake disk or drum of the wheel brake of the vehicle wheel undergoing a loss of traction.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the U.S. is:

1. A pressure switch valve, for hydraulic vehicle brake systems with traction control (ASR), comprising a cylindrical chamber (16), having an inflow conduit and an outflow conduit for pressure fluid, a longitudinally movable valve closing first ball (18) and a second ball (19) in axial alignment in said cylindrical chamber, a compression spring (20) in contact with said second ball (19) that applies an axial force directly on said second ball and indirectly on said closing first ball in which said closing first ball cooperates with a valve seat (8), said closing first ball (18), said second ball (19) and said compression spring are received in said cylindrical chamber (16) with slight radial play and disposed along a longitudinal axis of said cylindrical cylinder, and said closing first ball (18) engages the valve seat (8), said second ball (19) is supported on the first ball (18), under the influence of the compression spring (20) specifically on a side remote from the valve seat (8), an outflow conduit (23) which branches off from the cylindrical chamber (16) at a point such that upon switching of the pressure switch valve (1) and movement of the first ball such that a plane (25) normal to a longitudinal axis (17) of said cylindrical chamber (16) and through a spherical center of the closing first ball (18), does not reach a mouth cross section of the outflow conduit (23) until after a corresponding plane (24) relative to said second ball (19) has already passed beyond the mouth cross section of said outflow conduit (23).

2. A pressure switch valve as defined by claim 1, in which said cylindrical chamber (16) is formed by a bush-like hollow part (14), which is mounted tightly on a cylindrical attachment (7) which forms a part of a second cylindrical portion (6) of a wedged part (2) that has a through bore (3) connecting the valve seat (8) with an inflow conduit (10) that serves as a distributor conduit (4) for pressure fluid admitted by inflow conduit (10).

3. A pressure switch valve as defined by claim 2, in which the outflow conduit (23) is embodied as at least one opening (22) of cylindrical cross section in the hollow part (14).

4. A pressure switch vale as defined by claim 2, in which the wedged part (2) has a transverse bore (9), which branches off from the distributor conduit (4) and is provided as a part of said inflow conduit (10) for pressure fluid.

5. A pressure switch valve as defined by claim 4, in which the pressure switch valve (1) is pressed into a bore (28) of a housing (29) as a structural unit, and the outflow conduit (23) and the inflow conduit (10) are formed as a part of said housing (29).

6. A pressure switch valve as defined by claim 5, in which the bore (28) of the housing (29) serves as a connection neck (32) which connects with the distributor conduit (4) of the pressure switch valve (1), for carrying away pressure fluid.

7. A pressure switch as defined in claim 2, in which one end of said spring (20) is supported on a bottom (21) of said hollow part (14).

* * * * *